F. Henshaw,
Water Filter,
No. 69,433.  Patented Oct. 1, 1867.
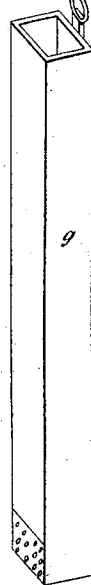
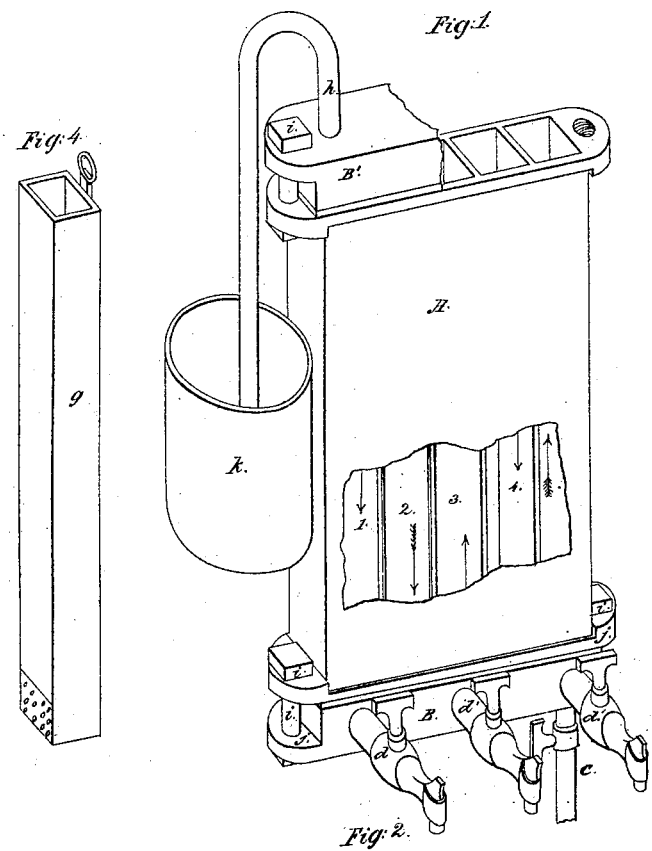
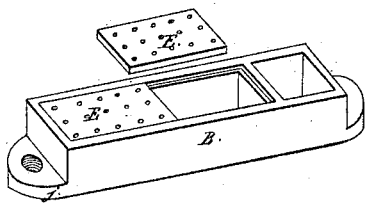
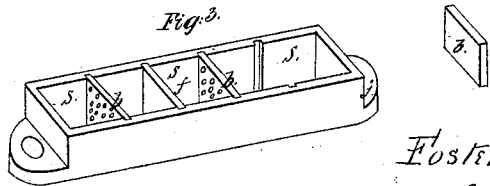
Witnesses:
Arthur Prentiss
Chs. F. Wilson
Inventor:
Foster Henshaw
By D. C. Colby
his attorney

United States Patent Office.

FOSTER HENSHAW, OF WASHINGTON, DISTRICT OF COLUMBIA.

*Letters Patent No. 69,433, dated October 1, 1867.*

---

IMPROVEMENT IN FILTERS.

---

*The Schedule referred to in these Letters Patent and making part of the same.*

---

TO ALL WHOM IT MAY CONCERN:

Be it known that I, FOSTER HENSHAW, of the city of Washington, District of Columbia, have invented new and useful Improvements in Filters for water and other liquids; and I do hereby declare the following to be a full and exact description of the same, reference being had to the drawings that accompany and form a part of these specifications, in which—

Figure I, perspective view of the filter with some of the shell broken away to exhibit the interior arrangement.

Figure II, view of one of the head-pieces or caps.

Figure III, view of the cap for the other end.

Figure IV, view of a removable chamber for holding charcoal.

A, body of the filter, made of common cast iron, with partitions and caps on each end. B B', the two caps, provided either with the strainer-plates E E, as in Fig. II, or plates standing vertical, as in Fig. III. C, supply pipe. $d\,d\,d$, waste-cocks or faucets, to give ready means to draw off the sediment and clean the filter. $e\,e\,e$, thin plates with numerous perforations, each plate extending over one charcoal-space and one sand-space, as seen in Fig. II. $f\,f\,f$, perforated plates setting in vertical grooves, and serve the same purpose as $e\,e\,e$, to wit, to keep the sand and charcoal from mixing, and give opportunity to remove the one without disturbing the other. $g$, separate chamber for the charcoal-spaces, and made just large enough to slide in the coal-spaces, as in Fig. I, space No. 2. The ring at the top serves to draw it out by. The openings near the lower end serve to let the water through into the next or sand-compartment. $h$, pipe taking off the water, and may lead into the reservoir $k$, which affords a quantity of filtered water on hand at any time. $i\,i\,i$, bolts with which the caps B B' are secured to the body of the filter A. $j\,j$, flanges for the bolts, as seen in Fig. I. $k$, tank or cistern for the water to run into when desired.

The object of my invention is to provide a water-filter that can be readily attached to a common water pipe, either at the out-door hydrant or in the kitchen, or indeed at any place desired, and so constructed that the sediment may be readily drawn off and the article cleansed.

The drawings will sufficiently illustrate the general structure of my invention.

It will be seen that the supply pipe C enters at the bottom of one of the sand-compartments so the water is forced to rise through the sand; it will therefore descend through the charcoal, the manner of passing from one chamber to another being by rising through the openings of one end of the plates $e$, and descending through the openings of the other end of the same plate, each of these plates extending over two compartments or chambers, as seen in Fig. II. We use the caps B with the plates $e\,e$ on the lower end of the filter, as this arrangement of the perforated plates gives more room for the sediment to settle in. The arrangement of the plates $f\,f$, as in Fig. III, is quite as well for the top cap, and serves to keep the sand and coal separate, and yet allow the water to pass through the openings from one compartment to another. There is great fitness in this arrangement by which the water is compelled to rise through the sand, for water descending through sand tends to pack it, and the flow of water is checked, but ascending the sand is kept loose. The charcoal is used to purify the water, and being in removable chambers $g\,g$, can be replaced with new and clean coal as often as may be desired. By opening the stop-cocks $d\,d'\,d''$ the water will flow out, bringing with it the sediment from the spaces in the cap B, the water in the supply pipe C being allowed to run the while until the water from $d$ comes clear. Should a more thorough cleansing of the filter be desired, $d\,d'$ may be closed, the supply pipe C also closed, and the water in the tank $k$, on the principle of a siphon, will flow through the filter and out at $d''$, cleansing all the compartments.

I claim as my invention—

1. The alternate sand and coal-chambers, either with or without the removable coal-chambers $g\,g$, when arranged and combined with the head-pieces, and the perforated plates $e\,e$ and $f\,f$, one or both, substantially as described and for the purposes set forth.

2. The said filter, when provided with the extension pipe $h$, as a siphon, in connection with the water-holder or tank, when arranged and combined as set forth.

FOSTER HENSHAW.

Witnesses:
D. C. CULLY,
CHAS. F. WILSON.